(12) United States Patent  (10) Patent No.: US 7,508,384 B2
Zhang et al.                 (45) Date of Patent:      Mar. 24, 2009

(54) WRITING SYSTEM

(75) Inventors: Guanglie Zhang, Hong Kong (CN); Guangyi Shi, Hong Kong (CN); Yilun Luo, Hong Kong (CN); Heidi Yee Yan Wong, Hong Kong (CN); Wen Jung Li, Hong Kong (CN); Philip Heng Wai Leong, Hong Kong (CN); Ming Yiu Wong, Kowloon (HK)

(73) Assignee: Daka Research Inc., Tortolla (VG)

( * ) Notice: Subject to any disclaimer, the term of this patent is extended or adjusted under 35 U.S.C. 154(b) by 671 days.

(21) Appl. No.: 11/149,055

(22) Filed: Jun. 8, 2005

(65) Prior Publication Data

US 2006/0279549 A1    Dec. 14, 2006

(51) Int. Cl.
G09G 5/00    (2006.01)

(52) U.S. Cl. ............... 345/179; 345/158; 178/18.01; 178/19.01

(58) Field of Classification Search ............ 345/179, 345/158; 178/18.01, 19.01
See application file for complete search history.

(56)     References Cited

U.S. PATENT DOCUMENTS 6,492,981 B1 * 12/2002 Stork et al. ............ 345/179
7,002,551 B2 * 2/2006 Azuma et al. .......... 345/158
7,245,483 B2 * 7/2007 Feague et al. .......... 361/683
2006/0061545 A1 * 3/2006 Hughes et al. .......... 345/156

\* cited by examiner

Primary Examiner—Richard Hjerpe
Assistant Examiner—Leonid Shapiro
(74) Attorney, Agent, or Firm—Curtis L. Harrington; Kathy E. Harrington; Harrington & Harrington

(57)    ABSTRACT

A Micro Inertial Measurement Unit (IMU) which is based on MEMS accelerometers and gyro sensors is developed for real-time recognition of human hand motions, especially as used in the context of writing on a surface. Motion is recorded by a rate gyro and an accellerometer and communicated to a Bluetooth module, possibly to a computer which may be 20 to 30 feet or more from the sensor. The motion information generated and communicated is combined with appropriate filtering and transformation algorithms to facilitate a complete Digital Writing System that can be used to record handwriting on any surface, or on no surface at all. The overall size of an IMU can be less than 26 mm×20 mm×20 mm, and may include micro sensors, a processor, and wireless interface components. The Kalman filtering algorithm is preferably used to filter the noise of sensors to allow successful transformance of hand motions into recognizable and recordable English characters. The immediate advantage is the facilitation of a digital interface with both PC and mobile computing devices and perhaps to enable wireless sensing.

10 Claims, 3 Drawing Sheets

WRITING SYSTEM

FIELD OF THE INVENTION

The present invention relates to the field of communication and writing and more particularly to a writing system which can convert the motion of writing into text to facilitate the creation, dissemination and recording of hand written information, such as written on paper, board, or the like.

BACKGROUND OF THE INVENTION

Physical writing systems which translate body movement into a physical mark have had great advantage in terms of facilitating free expression, but have presented challenges in conversion to electronic format. Much of the progression of techniques began with optical character recognition based upon scanning completed writings. Advances in this field were remarkable. However, much of the input was dependent upon framing, taking the whole of the written surface into account and making decisions about where one letter or word begins and ends. Current optical character recognition using typed characters from written documents has achieved a high state of fidelity. Hand written character conversion has achieved much less fidelity. Optical conversion of non characters into some other format has lowest fidelity.

It is clear from the foregoing that the best results may only be attainable by the ability to record and store complete frames of graphical data, especially to garner frame reference information. Devices which have enabled users to record such information have always generally required some multi-component electronic system to begin with. Most text documents are generated electronically, then converted to paper format, with the paper being optically scanned later.

Screen writing electronics have required a special pen which interacts with a specialized screen. Most of these types of devices are hand held and the screens have pressure detection devices to record the coordinates in essentially real time format based upon the repetitive strobing of the coordinates. The screens are of limited size and the resolution, and have a significant cost aspect.

Other systems have enabled users to write on specific, defined surface areas which have generally restricted writing area limits. Tracking the position of the writing tool has been done by sonic detection, optical detection and electromagnetic wave reception. All of these techniques have required a special pen which is configured to work with a special receiver which is mounted at a specific location relative to a defined area board.

Thus, these types of writing system detectors require a board, receiver, transmitter, and predetermined receiver location. The transmitter has to be specially configured to fit onto a special dry-erase pen, chalk or other marker, and in a way which maintains communication with the receiver. In some cases a switch or other indicator is needed to indicate the contact of the pen/transmitter to the board.

In one board system a receiver is placed at the corner of a whiteboard. That receiver uses infrared and ultrasound technologies to translate the pen movement into a signal detected by the computer. Others have attempted optical detection techniques where a specialized pen emits an electromagnetic or sound wave that would be deflected by micro structures built onto a specialized digital writing surface. By detecting the reflected light, the pen can be made to record its coordinate position on the paper. Hence, all existing products required special writing surfaces or attachments for the system to function.

What is needed is a system which will free itself, to the extent possible from the relatively large number of components mentioned above. Of the transmitter, receiver, board, defined mounting space, and required surface topology, if all but one can be eliminated, the progression toward high fidelity of reproduction, ease of use, and inexpensiveness can be bridged.

SUMMARY OF THE INVENTION

A Micro Inertial Measurement Unit (IMU) which is based on micro-electro-mechanical systems (MEMS) accelerometers and gyro sensors is developed for real-time recognition of human hand motions, especially as used in the context of writing on a surface. Motion is recorded by a rate gyro and an accellerometer and communicated to a Bluetooth module, possibly to a computer which may be 20 to 30 feet or more from the sensor. The motion information generated and communicated is combined with appropriate filtering and transformation algorithms to facilitate a complete Digital Writing System that can be used to record handwriting on any surface, or on no surface at all. The overall size of an IMU can be less than 26 mm×20 mm×20 mm, and may include micro sensors, a processor, and wireless interface components. The Kalman filtering algorithm is preferably used to filter the noise of sensors to allow successful transformance of hand motions into recognizable and recordable English characters. The immediate advantage is the facilitation of a digital interface with both PC and mobile computing devices and perhaps to enable wireless sensing. The writing device captures human hand writing and drawing motions in real-time and can store human motion strokes for character recognition or information retrieval at a later time, or can be telemetered for real-time treatment. A generalized Digital Writing Instrument (DWI) based on MEMS motion sensing technology that can be potentially used ubiquitously, i.e., can be used on any surface at any time in any orientation. Creation of this novel DWI system includes integration of several MEMS acceleration and gyro sensors with wireless transmission circuit design, advanced signal processing techniques, such as Kalman filtering and Hidden Markov Models for improved sensor calibration and stroke based recognition. The system herein improves the efficiency of capturing and storing information using human writing-strokes as the computer input interface rather than type-stokes as have been done for decades through a keyboard.

The benefits of this system are many and include (1) allowing users to store hand-written meeting or teaching notes in real-time, (2) the ability to enable users to draw and modify complex drawings or figures without having to learn complex software tools, (3) the freeing of the writing tool from any particular marker format, board geometry or other fixed platforms, and (4) the ability to provide a real-time writing screen on any computer based upon writing, with or without marking, on any surface, or simply in the air.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The novel writing system herein is based on MEMS motion sensing technology. Owning to the availability of low-cost, small-size MEMS sensors, a self-contained inertial sensor with overall system dimension of less than 1 cubic inch can be attached to any type of writing tool. The sensors unit can track the orientation and locomotion of the sensor, and thus any object to which the sensor is attached, in real time. Further, a novel multi-functional interface input system, which could optionally replace a computer mouse, replaces the pen and the keyboard as input devices to the computer.

Figure 1:
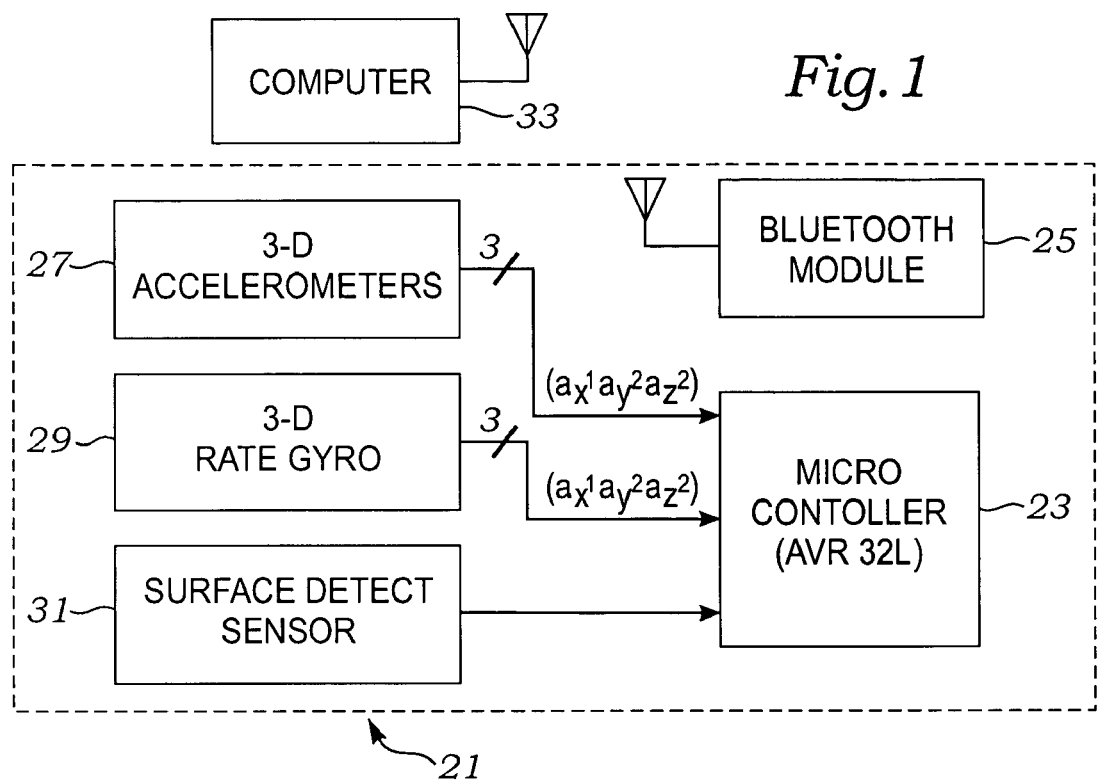
FIG. 1 is a block diagram of one possible configuration of the writing system showing connection between accelerometers, rate gyros, surface detect sensor micro-controller and a Bluetooth module.

FIG. 1 illustrates one possible block diagram of a writing system 19 sensor unit 21 of the present invention. The embodiment shown illustrates a digital writing system 21 sensor unit 21 having a three dimensional motion-sensing system. In general, the writing system 21 of the invention can be considered as more systematically described by describing the system by resort to explanation as two areas. The first area to be discussed is the hardware for the pen with sensors, which may be wireless. The other area to be discussed is the software structure for data access, spatial tracking and handwriting recording.

The writing system 19 sensor unit 21 includes a mircro controller 23. Micro controller 23 may preferably be a micro controller commercially available as an ATMEL Atmega32. This type of micro controller 23 preferably has a 32K byte flash, 2K byte of SRAM 8 channels 10-bit ADC and preferably has a USART (Universal Synchronous and Asynchronous serial Receiver and Transmitter) port. A communications module is preferably a Bluetooth module 25 is connected with the micro controller 23 by a universal asynchronous receiver/transmitter (UART) at a preferable minimum baud rate of 56.2 KHz. The Bluetooth module 25 is very small in size (69 mm×24 mm×5 mm in size) and is convenient to communicate with the micro controller 23. The Bluetooth module 25 is commercially available from TDK Systems Europe Limited, and is described in a publication entitled "blu$^{2i}$ Module User Guide", published in 2004.

A three dimensional accelerometer 27 is connected to the micro controller 23. Preliminary tests have shown that a commercially available three dimensional accelerometer serial No ADXL203 from "Analog Devices Company" works well. A three dimensional rate gyroscope 29 is also connected to the micro controller 23. A commercially available three dimensional rate gyroscope serial No ADXRS300 from "Analog Devices Company" is acceptable as a rate gyroscope 29.

An optional surface detect sensor 31 is also connected to the micro controller 23 to signal the beginning and ending of the writing process, assuming that writing is to be done on a surface whose close proximity is to be detected. In place of the surface detect sensor 31, a switch may be positioned on the sensor unit 21 to indicate that writing is to begin and end. In this configuration, the pen or simply the unit can be operated in mid air. This also opens the possibility of communication through an electromagnetic link where no surface is available. The user can simply manipulate the sensor unit 21 in mid air to communicate.

The Bluetooth module 25 is preferably in radio communication with a computer 33 having a receiver and antenna or other sensing device for receiving a communication signal from the communication portion of the Bluetooth module 25. The communications link between the computer 33 and the Bluetooth module 25 should be strong, clear, and permit effective communication from the sensor unit 21 over an effective range which will enable a user to write across a long, wide white board as needed. The frequency of the communication signal should not be subject to interference from the writer's positioning of his body with respect to a whiteboard, nor from which way the writer is positioned when using a smaller writing surface. Computer 33 will preferably have storage capability, display program capability, and will preferably have character recognition ability, especially where it is desired to convert the written text directly to ascii or word processore based digital letters and words.

The surface detect sensor 31 can be of any type, contact switch, proximity sensor or optic. In one embodiment, the surface detect sensor 31 utilizes, a focused infrared photo detector, such as a commercially available No. QRB1114 from Fairchild Semiconductor Corporation part, is used. This type of sensor for use as a surface detect sensor 31 is very useful for non-contact surface sensing. This type of sensor (QRB1114) has a narrow range of detection making it more sensitive to use as the surface detection sensor.

The output signals of the accelerometers 27 include three signals, $a_x$, $a_y$, and $a_z$. The output signals of the three dimensional rate gyroscope 29 include three signals $\omega_x$, $\omega_y$, and $\omega_z$. The surface detection sensor 31 may preferably be measured directly with an A/D converter inside the micro controller 23. The digital sample rate of the micro controller 23 may preferably be is 200 Hz, to ensure rapid reaction to the beginning and termination of human handwriting. The three dimensional accelerometer 27 and three dimensional rate gyroscope 29 act as inertial measurement units (IMU). These IMU sensors and the surface detection sensor may be housed in a pen tip architecture.

Figure 2:
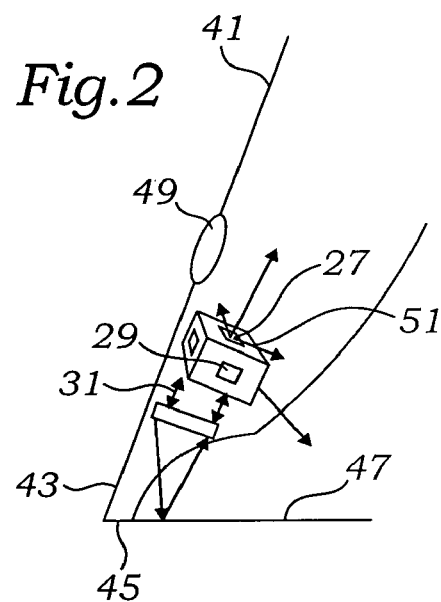
FIG. 2 is a spatial diagram of one configuration of a pen with friction tip, optional position sensor, activation button and an inertial measurement unit (IMU) package.

Referring to FIG. 2, an outline of one possible embodiment of a pen 41 is shown. Pen 41 is simply a housing or any structure into which the three dimensional accellerometer 27 and three dimensional rate gyroscope 29 is placed. The pen 41 has a nib 43 which may include a friction tip 45, which may be compatible with a writing surface 47 should such a surface be provided. A button 49 can be used to supplant or be connected in parallel with a proximity type surface detect sensor 31. The surface detect sensor 31 is shown outputting a light beam which reflects back onto another portion of the sensor 31 to detect the proximity of the writing surface 47. Also seen within the pen 41 is an IMU 51 which includes the three dimensional accelerometer 27 and the three dimensional rate gyroscope 29.

FIG. 2 illustrates simply one example of a housing, such as a pen 41 or other shaped housing. A housing can be made to attach selectably to another object or writing tool, such as a dry-erase marker or length of chalk, chalk holder, pen or pencil. The length between the IMU 51 and the tip 45 or end of the writing tool where the mark is made may require an adjustment. For example, where a housing is mounted on the end of a pencil, and where the user makes a "c" mark, the IMU 51 will experience a reverse "c" if it is on the other side of a central point. Conversely, a "c" made on a chalk board would have the same sense if the IMU 51 were placed near the marking tip as it would if placed at the opposite end of the marker. The computer 33 will likely contain a way to reverse the recorded and stored line or drawing formed.

In addition, and especially where the user draws or performs writing not on an even surface, the microcontroller 23 will have correction for a changing depth of displacement. For example, a board may be located on a curved wall. Without the ability to curve fit and interpret the lines as occurring on a curved surface, the computer 33 might distort the drawing. Where extensive writing occurs on a curved surface, the computer 33 should be able to "uncurve" the surface and form a corrected two dimensional representation of the writing.

Figure 3:
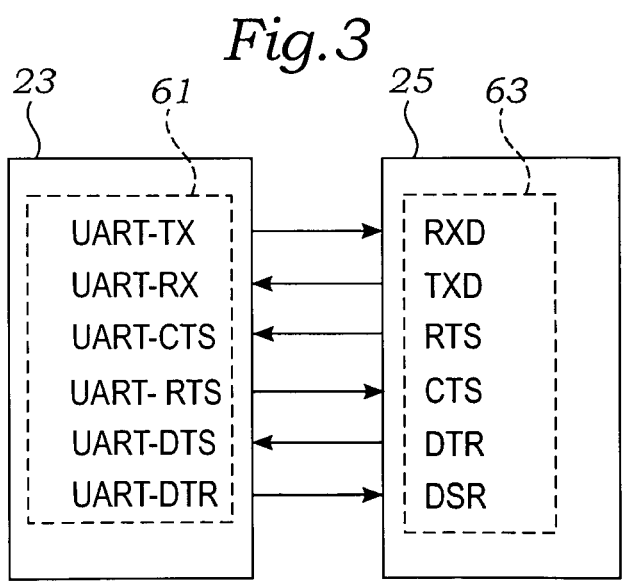
FIG. 3 is a communications block diagram of one possible configuration of connectivity between a micro controller and a Bluetooth module.

Referring to FIG. 3, a closeup detail of the specifics of the connection between the micro controller 23 and the Bluetooth module 25 is seen. The micro controller 23 has an on board UART module 61 having UART_TX, UART_RTS, & UART_ DTR outputs and has UART_RX, UART_CTS, & UART_DTS inputs. Conversely, the Bluetooth module 25 has an on board universal synchronous-asynchronous receiver transmitter (USART) module 63 having RXD, CTS & DSR inputs and TXD, RTS, & DTR outputs.

The Bluetooth module 25 is also known as blu$^{2i}$ and contains a complete Bluetooth interface and requires no further hardware to implement full Bluetooth type communication. The Bluetooth module 25 has an integrated, high performance antenna together with all radio frequency (RF) and baseband circuitry needed. The Bluetooth module 25 interfaces to the micro controller 23 over a straightforward serial port using Hayes AT-style command protocol.

Figure 4:
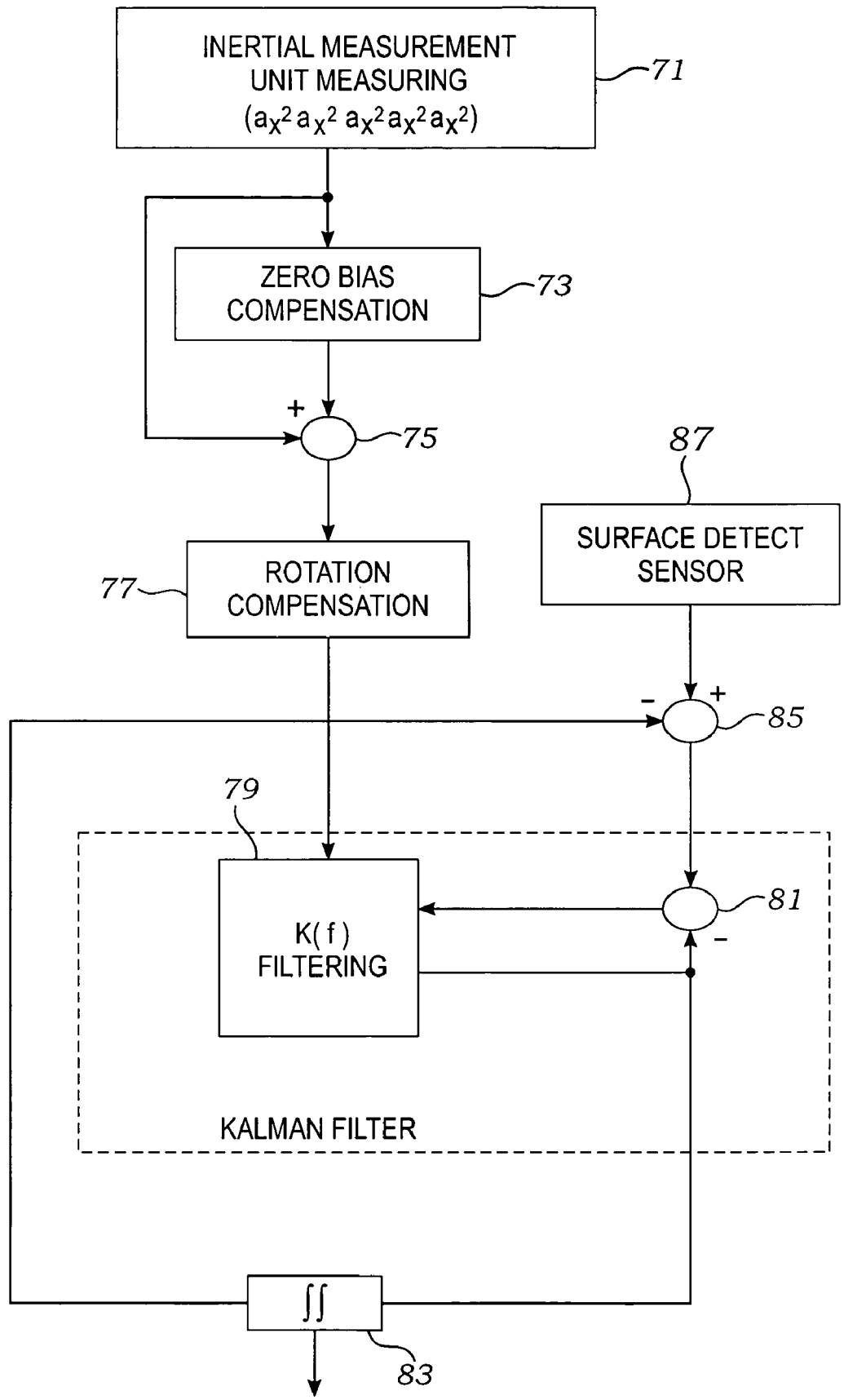
FIG. 4 is a control schematic showing the flow of the relationship of a zero bias compensation with respect to Kalman filtering and an integrator and emphasizing how rotation compensation is accomplished.

Referring to FIG. 4, a block diagram illustrating one possible overall configuration for the software is shown. In general, the software for the micro controller 23 may use a fixed sampling time to convert the analog signals of the sensors, including three dimensional accelerometer 27 and three dimensional rate gyroscope 29. The digitization can be accomplished through an analog to digital (A/D) converter, and then become packaged in the micro controller 23. This type of processing decreases the transfer errors. Finally, the packaged data are conveyed through the wireless Bluetooth module into a host personal computer (PC) for further processing and reconstruction of handwriting.

The architecture of the software on the host PC for the wireless digital writing system as organized as in FIG. 4 is seen in a control flow format. There are four main operating subsystem in this software implementation, including (1) zero bias compensation, (2) rotation compensation, (3) Kalman filtering and (4) integral operation of accelerations for position results. In order to improve the precision for the inertial measurement unit, a zero bias compensation and rotation compensation algorithms in the software architecture are used.

Specifically referring to FIG. 4, an Inertial Measurement Unit Measuring block 71 represents the measurement inputs from the three dimensional accelerometer 27 and three dimensional rate gyroscope 29, with its quantities $a_x$, $a_y$, $a_z$, $\omega_x$, $\omega_y$, $\omega_z$. The output signal from Inertial Measurement Unit Measuring block 71 is made available both to a Zero Bias Compensation block 73 and as a positive input to a summing junction 73. The Zero Bias Compensation block 73 has a negative output supplied to the summing junction 75. The output of the summing junction 75 is supplied to a Rotation Compensation Block 77. The output of the Rotation Compensation Block 77 is supplied to a Kalman Filtering block 79 designated $K_{(t)}$ Filtering. The output of the Kalman Filtering block 79 is made available as a negative input to a summing junction 81 and as a positive output to an integrator 83.

The summing junction 81 has an positive output feeding back to the Kalman Filtering block 79. The summing junction 81 receives a positive input from a summing junction 85 output. Summing junction 85 receives a positive input from a Surface Detect Sensor Block 87 which may in physical realization be either the optional surface detect sensor 31 or the switch button 49.

After some pre-processing for the sensors' data occurs, a filtering algorithm is used because of the fact that the noise associated with three dimensional accelerometer 27 and three dimensional rate gyroscope 29 is Gaussian white noise and occupies the entire spectrum of frequencies. Kalman filtering is useful to eliminate this type of noise. The Kalman filtering algorithm is a key part of reducing interference in the implementation shown. After filtering, the handwriting can achieve by integral operation with acceleration signals from the three dimensional accelerometer 27 and three dimensional rate gyroscope 29.

Zero bias and the elimination of drift are accomplished by the configuration shown. The output of the three dimensional accelerometer 27 and the three dimensional rate gyroscope 29 is a constant voltage which may be properly referred to as zero bias when the inertial unit is stationary. However the zero bias would tend to drift due to the effect of temperature and the white noise output of the sensors, including both the three dimensional accelerometer 27 and the three dimensional rate gyroscope 29. The Zero Bias Compensation block 73 corrects this tendency to drift.

The measured accelerations and angular rate gyros output can be compensated by methods according to the following summation relationships:

$$a_0 = \frac{1}{N}\sum_{k=1}^{N} a_k$$

and $$\omega_0 = \frac{1}{N}\sum_{k=1}^{N} \omega_k$$

where, $a_k$ is the acceleration rate and $\omega_k$ is the angular rate. The data is sampled at time k, and N is the number of sampled data. Then the actual output of accelerometers and angular rate gyros can be given by the relationships:

$$a = a_k - a_0 \text{ and } \omega = \omega_k - \omega_0.$$

The noise of the sensor output has the characteristics of white Gaussian, which contributes equally at all frequencies and is described in terms of $\mu G/(Hz)^{1/2}$, meaning that the noise is proportional to the square root of the accelerometer's bandwidth. Kalman filters are very useful linear filters for tackling such noise characteristics. The sensor can be described by a linear system as the following equations, (1) State equation:

$$x_{k+1} = Ax_k + Bu_k + w_k$$

(2) Output equation:

$$y_k = Cx_k + z_k$$

where, $x_k$ is the state of the linear system, k is the time index, u is a known input to the system, y is the measured output, and w and z are the random variables represent the process and measurement noise respectively. C is a matrix, the measurement matrix. As a sensor system has no input, the matrix B is zero. A is the state transition matrix as follows below, where, T is the sample time:

$$A = \begin{bmatrix} 1 & T & T^2/2 \\ 0 & 1 & T \\ 0 & 0 & 1 \end{bmatrix}$$

The Kalman filter estimates the process state at some time and then obtains feedback in the form of measurements. So there are two steps in the filter, time update and measurement update. Time update equations are, $$\hat{x}^-_k = A\hat{x}_{k-1} + Bu_k \text{ and } P^-_k = AP^-_{k-1}A^T + Q$$

where $x_{k-1}$ is the initial estimate of the process state and $x_k$ is the priori process state and Q is the covariance of the process noise.

The measurement update equations are:

$$K_k = \frac{P^-_k C^T}{CP^-_k C^T + R}; \quad x_k = x^-_k + {}^\wedge K_k(\hat{z}_k - Cx^-_k); \quad \& \quad P_k = (I - K_k C)P^-_k$$

where $K_k$ is Kalman gain, C is the measurement matrix, and $x_k$ is the updated estimate of the process state and $P_k$ is the updated error covariance.

Figure 5:
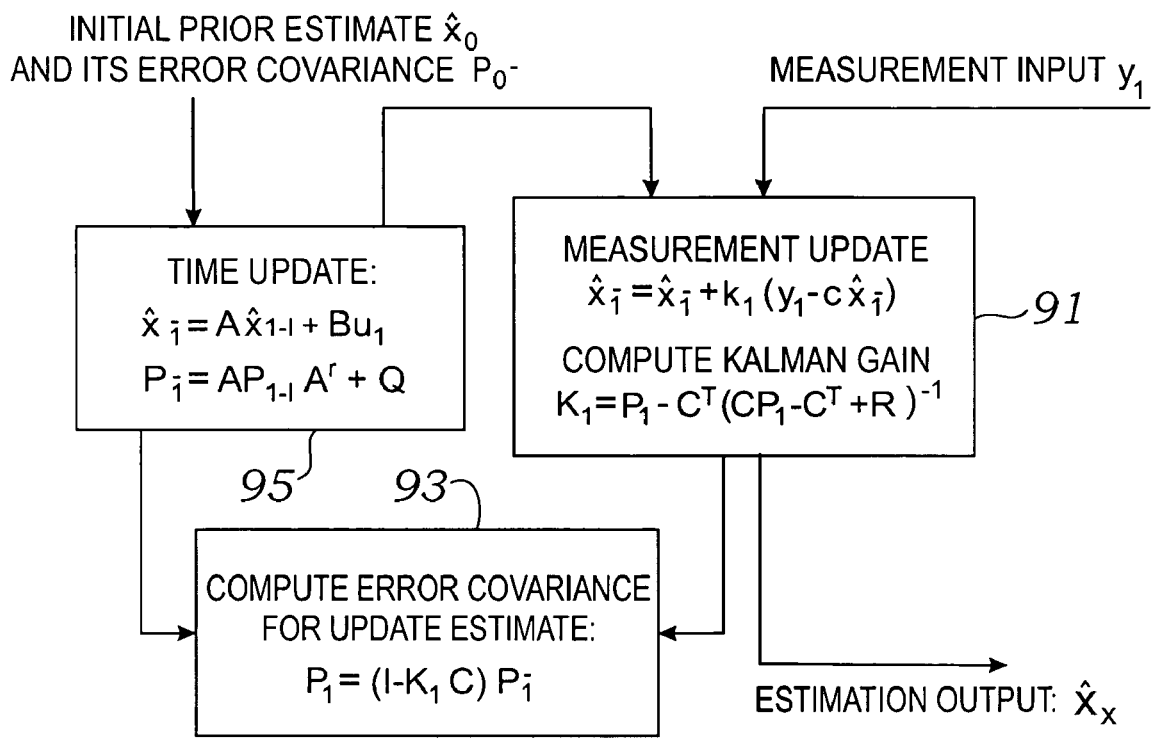
FIG. 5 is a block diagram showing the overall feedback loop using time update, error covariance, measurement update as a loop for processing movement input and producing an estimation output.

Referring to FIG. 5, a process flow representation of the Kalman filter algorithm is shown. A measurement input Yi is input to a Measurement update and Compute Kalman gain block 91. An estimation output is outputted from the Measurement update and Compute Kalman gain block 91, and made available elsewhere, as well as being fed into a computer error covariance for update estimate block 93. The error covariance computed is then fed to a time update block 95. Time update block 95 also receives an input from the initial prior estimate and its error covariance and feeds the time update back to the measurement update and Compute Kalman gain block 91. This circuit provides for a delayed prior estimate and covariance introduction along with the measurement input to perform the feedback loop, and additionally makes the estimation output available elsewhere as needed.

Figure 6:
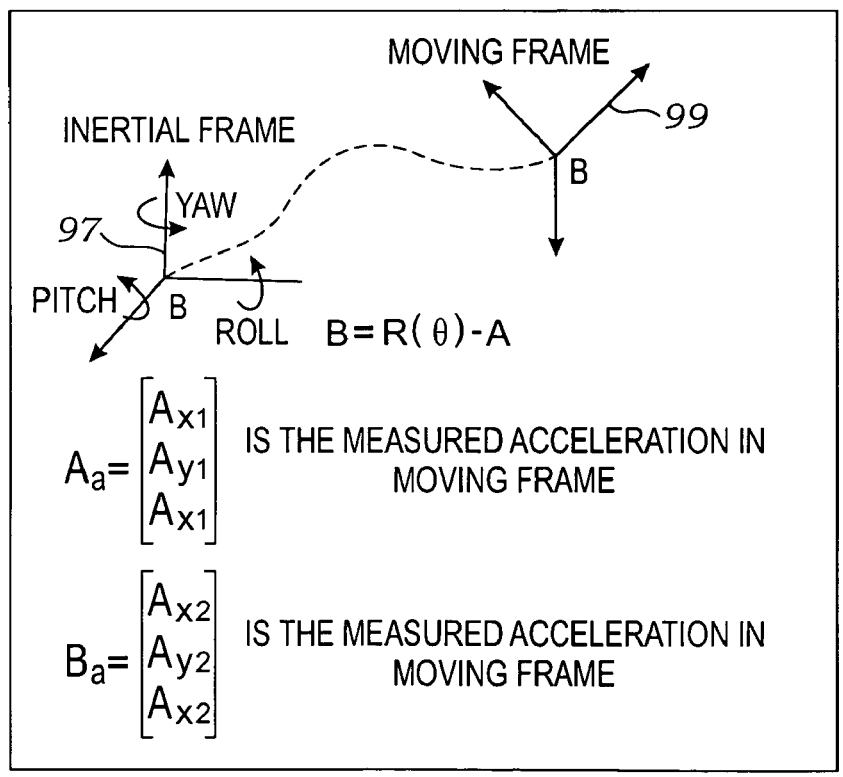
FIG. 6 illustrates pictorially the relationship between matrix transformations for converting an acceleration in a moving frame to acceleration in an inertial frame in accord with matrices shown in the specification.

The attitude rotation conversion is an operation performed to enable the IMU 51 to be tracked in three dimensional space. The method and reference used is a fixed inertial frame with an orthonormal basis to describe the position in the space. The initial coordinate system is called the inertial frame. And the motion coordinate system is called the moving frame associated with the inertial unit, as shown in FIG. 6. In order to measure the transformation from the moving frame to the inertial frame, we use the Rotation Matrix to describe this operation.

$$R(\Theta) = R_{YAW} R_{ROLL} R_{PITCH}$$

where:

$$R_{YAW} = \begin{bmatrix} \cos\phi & \sin\phi & 0 \\ -\sin\phi & \cos\phi & 0 \\ 0 & 0 & 1 \end{bmatrix}$$

$$R_{YAW} = \begin{bmatrix} 1 & 0 & 0 \\ 0 & \cos\phi & \sin\phi \\ 0 & -\sin\phi & \cos\phi \end{bmatrix}$$

$$R_{PITCH} = \begin{bmatrix} \cos\phi & 0 & -\sin\phi \\ 0 & 1 & 0 \\ \sin\phi & 0 & 1 \end{bmatrix}$$

$R_{YAW}$, $R_{ROLL}$, and $R_{PITCH}$ are each a transformation matrix based on roll, pitch and yaw directions, respectively, as shown in FIG. 6, and can be estimated by the three dimensional rate gyroscope 29. FIG. 6 shows an inertial frame 97 and its movement to a moving frame 99. The matrices shown can be used to track acceleration in the moving frame and the inertial frame. Thus, the acceleration in any moving frame 99 is translated back to an inertial frame which is registered with respect to "where the writing surface is" in terms of a surface detect device, or more generally "orientation when writing begins" where button 49 is used to trigger the beginning of writing. The frame translation can take account of individual writer's habits and pen angle in translating any moving frame 99 back to an inertial frame 97 which is referenced to any real, theoretical, or imaginary writing surface the user is indicating in space, making up for any shifts in angle of attack. Shifts in angle of attack often occur when a writer starts writing at the left with one writing angle and ends up at the right with another writing angle. The same principles apply to vertical writing.

Regarding surface detection, since the inventive wireless digital writing system does not require any special paper or white board, the wireless pen should detect when the friction tip 45 touches any surface, or perhaps comes close enough that the surface detect sensor 31 indicates the presence of a surface. Depending on the surface detect sensor 31 used, some surface colors may trigger the start of writing differently or at different levels above the surface. The same differences in triggering applies to for surfaces which may be glossy versus flat. Depending upon which surface detect sensor 31 is chosen, it can be displaced from the friction tip 45 as a method of adjusting the threshold of engagement. In some models of pen 41, the surface detect sensor 31 may be mounted to be user selectably displaceable toward and away from friction tip 45 to enable the user to adjust the threshold most convenient for the respective user. This is shown by the double arrows in FIG. 2. Detection of the beginning of writing, either by surface detect sensor 31 or bye manual button 49 triggers the IMU 51 to initiate the motion detection procedures.

Comparisons were made writing with and without the Kalman filtering, and the differences were dramatic. For example, with Kalman filtering, the letter "N" can be seen as having two angular transitions. The letter "N" written without Kalman filtering shows a number of false angular constructions in addition to the two angular transitions.

In order to calculate the position, it is preferable to use the integral operations for the accelerations according to the following equation:

$$s_k = s_{k-1} + v_{k-1}T + \tfrac{1}{2}aT^2$$

where, $s_k$ and $v_k$ and are position and velocity at time k respectively, a is acceleration and T is the sample time. Individual positions of x and y may be separately and independently calculated and recorded. The characters can be written or recorded separately and then and then merged into a composite x-y frame.

The inventive ubiquitous wireless digital writing system using an inertial measurement unit IMU 51 with MEMS motion sensors for hand movement tracking. The writing system consists of an IMU 51, an optional surface detection sensor 31, a computing microprocessor/micro controller 23 and a wireless module which is preferably a Bluetooth module 25. The invention uses Kalman filtering as a very effective technique to reduce noise for the hand motion tracking IMU 51.

While the present invention has been described in terms of a writing system which provides users with an ability to transmit hand and arm movement of a writing tool or non-marking stylus into a graphical representation (and possibly with optional character recognition)and the ability to save and recall the utilized writing space, regardless of whether or not a surface or defined space is used for writing, the present invention may be applied in any situation where frame reference tracking, accelerometers, and rate gyroscopes are utilized separately or in concert to produce a storable digital written record from the movements of a the degree of integration of a system is matched with the needs of a user and designed to facilitate actual use at a helpful level rather than a system wide integration to actually lower utility.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A writing system comprising:
   a housing;
   a three dimensional accelerometer, supported by said housing, for of detecting acceleration of the accelerometer in any direction, and having an accelerometer output;
   a three dimensional rate gyroscope, supported by said housing, for detecting angular position orientation changes along all planes, and having a gyroscope output;
   a microcontroller having an input connected to said accelerometer output and said gyroscope output and configured to convert said accelerometer output and said gyroscope output into a two dimensional line path as a representation of a path of said housing during writing, and
   a surface detect sensor, supported by said housing and connected to said input for indicating a start and a finish of said two dimensional line path as a beginning and ending of writing.

2. The writing system as recited in claim 1 wherein said microcontroller includes an input for indicating a start and a finish of said two dimensional line path as a beginning and ending of writing.

3. The writing system as recited in claim 2 and further comprising a switch connected to said input for indicating a start and a finish of said two dimensional line path as a beginning and ending of writing.

4. The writing system as recited in claim 1 and further comprising transmitter supported by said housing for transmitting a representation of said two dimensional line path to a location remote with respect to said housing.

5. The writing system as recited in claim 4 wherein said transmitter is a Blue tooth module.

6. The writing system as recited in claim 5 wherein said microcontroller includes a UART module and communicates with said Blue tooth module utilizing a universal asynchronous receiver transmitter protocol.

7. The writing system as recited in claim 5 wherein said Blue tooth module includes a USART module and communicates with said microcontroller module utilizing a universal synchronous asynchronous receiver transmitter protocol.

8. The writing system as recited in claim 1 and wherein said microcontroller is configured to filter said accelerometer output and said gyroscope output utilizing Kalman filtering.

9. The writing system as recited in claim 8 and wherein said microcontroller is configured to compensate for rotation of said accelerometer output and said gyroscope output before utilizing said Kalman filtering.

10. The writing system as recited in claim 1 and wherein said microcontroller is configured to compensate said accelerometer output and said gyroscope output to create a zero bias output signal.

* * * * *